Oct. 7, 1947.  C. G. WAHLSTROM  2,428,439
SAW TOOTH SETTING DEVICE
Filed May 10, 1946
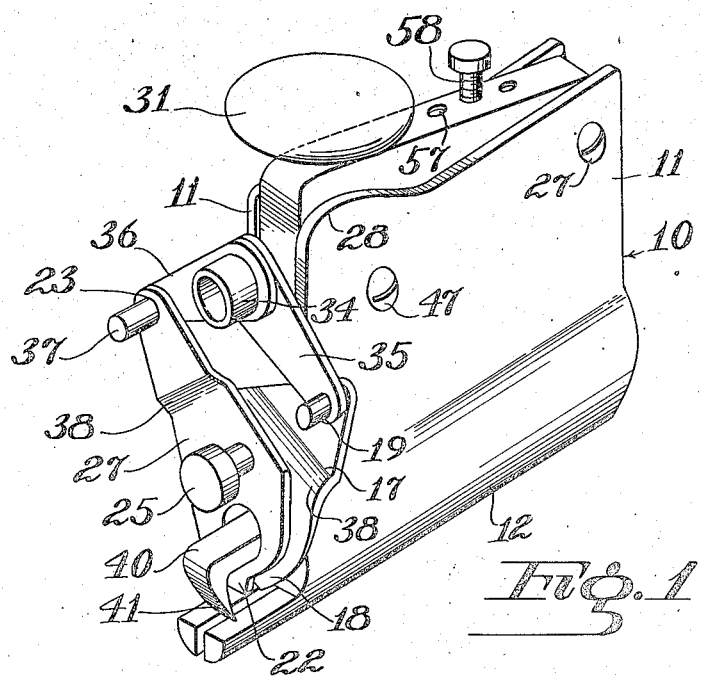
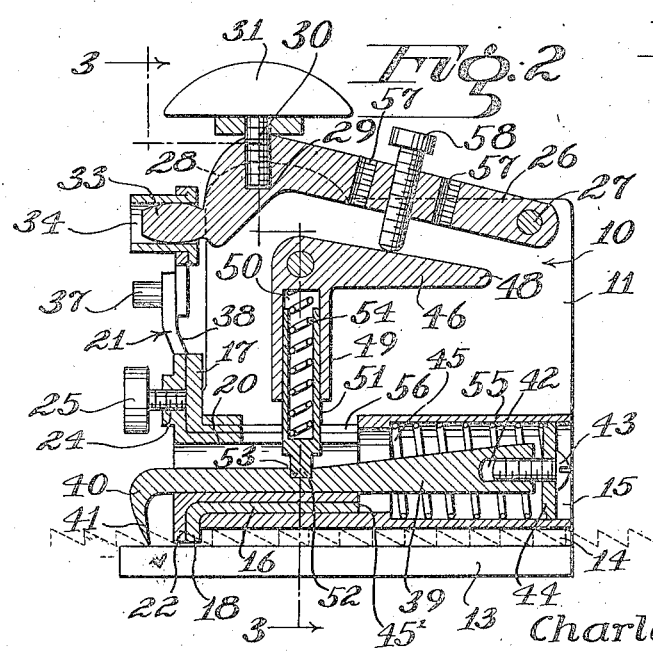
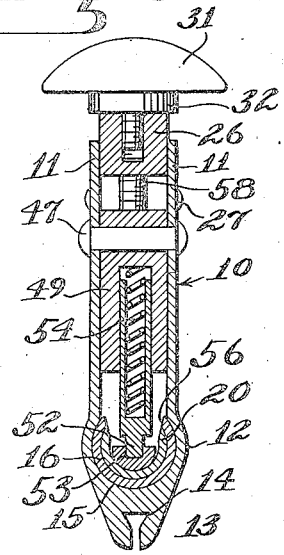
INVENTOR,
Charles G. Wahlstrom
BY
Christian R. Nielsen
ATTORNEY Patented Oct. 7, 1947

2,428,439

UNITED STATES PATENT OFFICE 2,428,439

SAW-TOOTH SETTING DEVICE

Charles G. Wahlstrom, Redwood City, Calif.

Application May 10, 1946, Serial No. 668,820

5 Claims. (Cl. 76—61)

This invention relates to a saw tooth setting device and it consists in the constructions, arrangements and combinations herein described and claimed.

It is a particular object of the invention to provide a saw tooth setting device in which a pair of saw teeth are simultaneously set through a single operation of the device, each tooth being equally offset with respect to the longitudinal axis of the saw body.

It is also an object of the invention to provide a saw set that will advance itself along a saw, as soon as a pair of teeth have been set.

It is a still further object of the invention to provide a saw tooth setting device in which the tooth engaging members may be quickly and readily adjusted to accommodate different sizes of teeth of saws, as well as controlling the degree of setting of the teeth of a saw.

It is also an important object of the invention to provide a device which is of simple construction, of relatively few parts and which may be operated by a workman of ordinary skill.

Additional objects, advantages and features of invention will be apparent from the following description and accompanying drawing, wherein Figure 1 is a perspective view of the device.

Figure 2 is a vertical sectional view thereof.

Figure 3 is a cross section on the line 3—3 of Figure 2.

There is illustrated a frame structure 10 consisting of a pair of vertical spaced walls 11 connected and enlarged inwardly of the lower ends thereof, as indicated at 12. A longitudinal channel 13 is formed in the lower end of the frame having an inner dove-tailed portion 14, permitting passage of the angularly set teeth of a saw when disposed in the channel.

Extending through the enlarged portion 12 of the frame there is an annular bore 15 within which there is oscillatably seated a barrel 16, the outer end thereof being formed with a plate 17 disposed at right angles to the barrel and occupies a position snugly against the forward end of the bore 15. The lower end of the plate 17 is formed with a tooth-engaging lug 18, the upper part being extended upwardly and provided with a pivot pin 19 inwardly of its extremity, for a purpose presently to be explained.

A barrel 20 is oscillatably seated within the barrel 16 and is formed with a plate 21 similar to the plate 17 including a lug 22, but instead of the pin 19 an aperture 23 is formed. In addition, however, the plate 21 has a threaded opening 24 intermediate the length thereof for reception of a thumb screw 25, the inner end of which engages the plate 17 for the purpose of adjusting the positions of the tooth-engaging lugs 18 and 22, as will be explained more fully hereinafter.

Between the walls 11 at an upper rearward position an operating lever 26 is rockably mounted upon a pin 27, the lever lying snugly between the walls so as to prevent lateral oscillations. The forward ends of the walls 11 are curved upwardly, as at 28, and function as stops limiting the downward movement of the lever 26. The lever 26 is formed with a vertically extended threaded bore 29 in which there is engaged a threaded stem 30 of an impact knob 31. The stem 30 has a thumb nut 32 thereon adjustable so as to limit downward movement of the lever. It will be understood that by turning the knob 31 so as to move the stem upwardly out of the bore 29, the thumb nut may be adjusted along the stem to a desired position. Thus when the lever 26 is moved downwardly the nut 32 will engage the upwardly curved portions 28 of the walls and stop further movement of the lever.

The lever 26 is formed with a forwardly extended bearing 33 engaged in a sleeve 34 of a link 35, the latter having its opposite end apertured for reception of the pin 19 of the plate 17. The sleeve 34 is of substantial length and pivotally mounts a link 36, the latter having a pin 37 for projection through the opening 23 of the plate 21.

The plates 17 and 21 are arranged in tandem relation, the upper ends diverging from the vertical axis through the frame, and in order that the lower ends of the plates may be brought into close contacting relation, as will be required in the setting of small saw teeth, the upper ends of the plates are offset in opposite directions as indicated at 38, which also allows proper movement of the links 35 and 36.

The barrels 16 and 20 are approximately one-half the length of the bore 15 so as to afford ample support thereof and extended through the barrel 20 there is a rod 39, the forward end being provided with a hook 40 having a downwardly presented tooth 41 adapted to progressively engage the teeth of a saw being set. The rod 39 is preferably enlarged toward its rear end which is formed with a threaded bore 42 for reception of a set screw 43, the latter mounting a plate 44 complemental to the bore 15. A helical spring 45 encircles the rod 39, one end thereof seating against a shoulder 45' while the other rests against the plate 44. The spring 45 draws rearwardly upon the rod and likewise upon the hook 40. The tension of the spring 45 may be adjusted by means of the screw 43.

In order that a progressive movement may be imparted to the hook 40, a bell crank lever 46 is rockably mounted between the plates 11 by means of a pivot pin 47, one arm 48 lying beneath and substantially parallel to the lever 26, while the other arm 49 extends downwardly at right angles thereto. The arm 49 is provided with a vertical bore 50 and receives a sleeve 51 the lower end of which is closed and provided with a lug 52 which is seated in a slot 53 formed in the upper portion of the rod 39. A helical spring 54 is enclosed in the sleeve 51, the upper end being seated in the bore 50, the spring exerting a downward pressure upon the sleeve to hold the lug 52 engaged with the slot of the rod 39.

In order that the lug 52 may be operatively connected with the rod 39, the upper interior wall 55 of the enlarged portion 12, and each of the barrels 16 and 20 are slotted as at 56, the slots being of such width as to permit oscillation of the barrels as will be required in operation of the device.

The operating lever 26 is provided with a plurality of threaded openings 57 spaced longitudinally thereof adapted to selectively receive a thumb screw 58. It will be apparent that the thumb screw 58 may be engaged in either of the openings and by adjustment toward or away from the arm 48, the degree of travel of the rod 39 and associated hook 40 may be regulated.

The operation of the set is substantially as follows: With the saw suitably supported in a vise or otherwise with teeth presented upwardly, the device is presented thereto, the teeth passing upwardly through the slot 13. As shown in Figure 2, the lugs 18 and 22 have been adjusted for setting teeth of a small toothed saw, each lug being arranged in opposed relation to a tooth of the saw. By imparting a blow to the knob 31 the lever 26 will swing downwardly, imparting outward opposite movement to the levers 35 and 36 and since these levers are pivotally connected to respective plates 17 and 21, these plates will be moved in opposite directions transversely of the teeth of the saw, and since the lugs 18 and 22 engage respective teeth, they will be forced laterally to provide the proper set to the teeth, the degree of offset of the teeth being determined by the setting of the thumb nut 32 and its engagement with elevated portions 28 of the plates 11.

As the lever 26 descends and the associated parts are motivated, a rocking movement will be imparted to the bell crank 46 through thumb screw 58 which effects a forward movement of the rod 39 a distance of two teeth so that the tooth 41 of the hook will be in position to engage the proper tooth to advance the saw set upon return of the parts to normal position.

In order to adjust the plates 17 and 21 to present the tooth-engaging lugs in spaced relation so as to be operative upon larger toothed saws, it is only necessary to tighten the thumb screw 25, which will move plate 21 forwardly from the plate 17 a proper distance. The thumb screw 58 is adjusted for the proper length of travel of the rod 39 and the tension of the spring 45 may also be adjusted.

While I have shown and specifically described a preferred construction, this is by way of illustration only, and I consider as my own all such modifications in construction as fairly fall within the scope of the appended claims.

I claim:

1. In a saw tooth setting device a frame having parallel upright walls connected and enlarged inwardly of their lower ends, the enlarged portion of the walls having an annular longitudinal bore therethrough, the lower end of said frame having a longitudinal dove-tail slot, a pair of plates arranged in tandem relation and oscillatably mounted on the front end of the frame, each plate having a tooth-setting lug upon its lower end traversing a path transverse of said dove-tail slot, a rockable lever mounted between said walls the free end projecting forwardly of the frame, link means between the free end of the lever and respective upper ends of the plates, to effect opposite oscillation of said plates upon downward movement of the lever, a hook member reciprocably mounted in the annular bore of the body and extending forwardly of said plates, spring means associated with the hook for holding the latter in a rearward position, link and lever means operatively engaged between said rockable lever and said hook member for advancing the latter a distance of two saw teeth against the expanding action of said spring.

2. The structure of claim 1 in which an adjusting means is provided between the rockable lever and the link and lever means to vary the forward movement of said hook member.

3. In a saw tooth setting device a frame having parallel upright walls, the lower edge of the frame having a dove-tail slot extending longitudinally thereof, an annular longitudinal bore being formed in said body above said slot and extending parallel therewith, a barrel oscillatably mounted in one end of said bore, said barrel having a plate at said end of the bore extending upwardly and divergent to the vertical axis of the frame, the lower end of the plate having a saw tooth engaging lug, a barrel oscillatably mounted in the first barrel and having a plate in tandem relation to the first plate and extending upwardly and divergent in the opposite direction to the first plate, a rockable lever mounted between said walls, the free end extending toward said plates, a pair of link members connected to said free end of the lever, one link being pivotally connected to the first plate and the other link being connected to the second named plate, a hook member including a shank reciprocably mounted in said second named barrel, said hook being positioned forwardly of said plates and adapted to engage teeth of a saw, spring means in said bore and operatively engaged with the shank of the hook member to hold the hook member in retracted position, a bell crank lever pivotally mounted between said walls and positioned to present one arm beneath said rockable lever, said rockable lever having a plurality of longitudinally spaced threaded openings, a threaded thumb screw engageable selectively in said openings for bearing contact with said arm of the bell crank lever, the other arm of the bell crank lever being operatively connected to the shank of the hook member to effect forward movement of the hook member under downward movement of the rockable lever and an impact knob having an adjustable stop engageable with said side walls.

4. The structure of claim 3, in which the second named plate has a threaded thumb-screw adapted to engage the first plate to adjust the tandem spacing between said plates.

5. The structure of claim 3 in which the second named arm of the bell crank lever includes a spring-pressed telescoping sleeve, said sleeve having a tongue and said shank having a slot for reception of said tongue.

CHARLES G. WAHLSTROM.